US012323912B2

(12) United States Patent
Fujishiro

(10) Patent No.: US 12,323,912 B2
(45) Date of Patent: Jun. 3, 2025

(54) COMMUNICATION CONTROL METHOD AND USER EQUIPMENT

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 491 days.

(21) Appl. No.: 17/819,349

(22) Filed: Aug. 12, 2022

(65) Prior Publication Data
US 2022/0394579 A1 Dec. 8, 2022

Related U.S. Application Data

(63) Continuation of application No. PCT/JP2021/004383, filed on Feb. 5, 2021.

(30) Foreign Application Priority Data

Feb. 13, 2020 (JP) ................. 2020-022522

(51) Int. Cl.
H04W 48/20 (2009.01)
H04B 7/185 (2006.01)

(52) U.S. Cl.
CPC ......... *H04W 48/20* (2013.01); *H04B 7/18513* (2013.01)

(58) Field of Classification Search
CPC . H04W 48/20; H04W 36/0061; H04W 48/16; H04W 84/06; H04B 7/18513
See application file for complete search history.

(56) References Cited

U.S. PATENT DOCUMENTS

| 11,445,562 | B2 | 9/2022 | Fujishiro et al. |
| 2019/0007129 | A1* | 1/2019 | Vargas ................. H04B 7/1858 |
| 2021/0014757 | A1 | 1/2021 | Fujishiro et al. |

FOREIGN PATENT DOCUMENTS

| WO | 2019/098135 A1 | 5/2019 |
| WO | 2019/194297 A1 | 10/2019 |

OTHER PUBLICATIONS

3GPP Technical Specification; "Technical Specification Group Radio Access Network"; 3GPP TS 38.321; Dec. 2019; Total 78 pages; V15.8.0; http://www.3gpp.org/ftp//Specs/archive/38_series/38.321/38321-f80.zip.
LG Electronics Inc.; "Report on Email Discussion [106#74][NTN] Cell Selection & Reselection"; 3GPP TSG-RAN WG2 Meeting #107; R2-1911297; Aug. 26-30, 2019; Total 6 pages; Prague, Czech Republic.
ZTE, Sanechips; "Report of Email Discussion [106#70][NR/NTN] RACH capacity/procedures"; 3GPP TSG-RAN WG2 Meeting #107; R2-1909256; Aug. 26-30, 2019; Total 19 pages; Prague, Czech Republic.

* cited by examiner

*Primary Examiner* — Kyaw Z Soe
(74) *Attorney, Agent, or Firm* — Studebaker Brackett PLLC

(57) ABSTRACT

User equipment according to an aspect performs cell reselection of selecting a serving cell by ranking a plurality of cells based on radio quality. Based further on whether a cell is a non-terrestrial cell, the non-terrestrial cell being formed by a radio transceiver of a satellite or an aircraft, the user equipment determines a rank of the cell in the cell reselection.

11 Claims, 11 Drawing Sheets

COMMUNICATION CONTROL METHOD AND USER EQUIPMENT

RELATED APPLICATIONS

The present application is a continuation based on PCT Application No. PCT/JP2021/004383, filed on Feb. 5, 2021, which claims the benefit of Japanese Patent Application No. 2020-022522 filed on Feb. 13, 2020. The content of which is incorporated by reference herein in their entirety.

TECHNICAL FIELD

The present invention relates to a communication control method and user equipment.

BACKGROUND ART

In recent years, standardization of New Radio (NR) as the fifth generation (5G) radio access technology has been carried out in the 3rd Generation Partnership Project (3GPP).

In NR communication, discussions for introducing a non-terrestrial network (NTN) in which a radio transceiver equipped in a satellite or an aircraft provides radio access to user equipment have been started in 3GPP (for example, NPL 1). The non-terrestrial network is useful for an area (an isolated area or a remote area, in an aircraft or a ship, or the like) that cannot be covered by a terrestrial network and a less developed area (a suburb or an agricultural village).

In communication between user equipment and a cell (hereinafter referred to as a "non-terrestrial cell") that is formed by a radio transceiver (hereinafter referred to as a "non-terrestrial radio transceiver") equipped in a satellite or an aircraft, the distance between the user equipment and the radio transceiver is significantly large, and thus a larger delay is caused due to such distant communication. It is conceivable that a network environment including the non-terrestrial cell requires mobility control that takes such a delay into consideration.

CITATION LIST

Non-Patent Literature

NPL 1: 3GPP Technical Report "TR 38.321 V15.8.0" January 2020, the Internet <URL: http://www.3gpp.org/ftp//Specs/archive/38_series/38.321/38321480.zip>

SUMMARY OF INVENTION

A communication control method according to a first aspect is a communication control method for cell reselection of selecting a serving cell of user equipment by ranking a plurality of cells based on radio quality. The communication control method includes, based further on whether a cell is a non-terrestrial cell, the non-terrestrial cell being formed by a radio transceiver of a satellite or an aircraft, determining, by the user equipment, a rank of the cell in the cell reselection.

A communication control method according to a second aspect is a communication control method for performing handover of user equipment from a source cell to a target cell. The communication control method includes, when the target cell is a non-terrestrial cell formed by a radio transceiver of a satellite or an aircraft, receiving, by the user equipment, a time offset to be applied to communication with the non-terrestrial cell from the source cell. The time offset is time for delaying start timing or expiration timing of a timer used at time of performing communication with the target cell.

User equipment according to a third aspect performs cell reselection of selecting a serving cell by ranking a plurality of cells based on radio quality. The user equipment includes a processor configured to execute processing of, based further on whether a cell is a non-terrestrial cell, the non-terrestrial cell being formed by a radio transceiver of a satellite or an aircraft, determining a rank of the cell in the cell reselection.

User equipment according to a fourth aspect performs handover from a source cell to a target cell. The user equipment includes a processor configured to execute processing of, when the target cell is a non-terrestrial cell formed by a radio transceiver of a satellite or an aircraft, receiving, by the user equipment, a time offset to be applied to communication with the non-terrestrial cell from the source cell. The time offset is time for delaying start timing or expiration timing of a timer used at time of performing communication with the target cell.

DESCRIPTION OF EMBODIMENTS

The present disclosure has an object to enable improvement of mobility control in a network environment including a non-terrestrial cell.

A mobile communication system according to embodiments will be described with reference to the drawings. In the description of the drawings, the same or similar parts are denoted by the same or similar reference signs.

Mobile Communication System

First, a configuration of a mobile communication system according to an embodiment will be described. Although the mobile communication system according to the embodiment is a 5G system of 3GPP, LTE may be at least partially applied to the mobile communication system.

Figure 1:
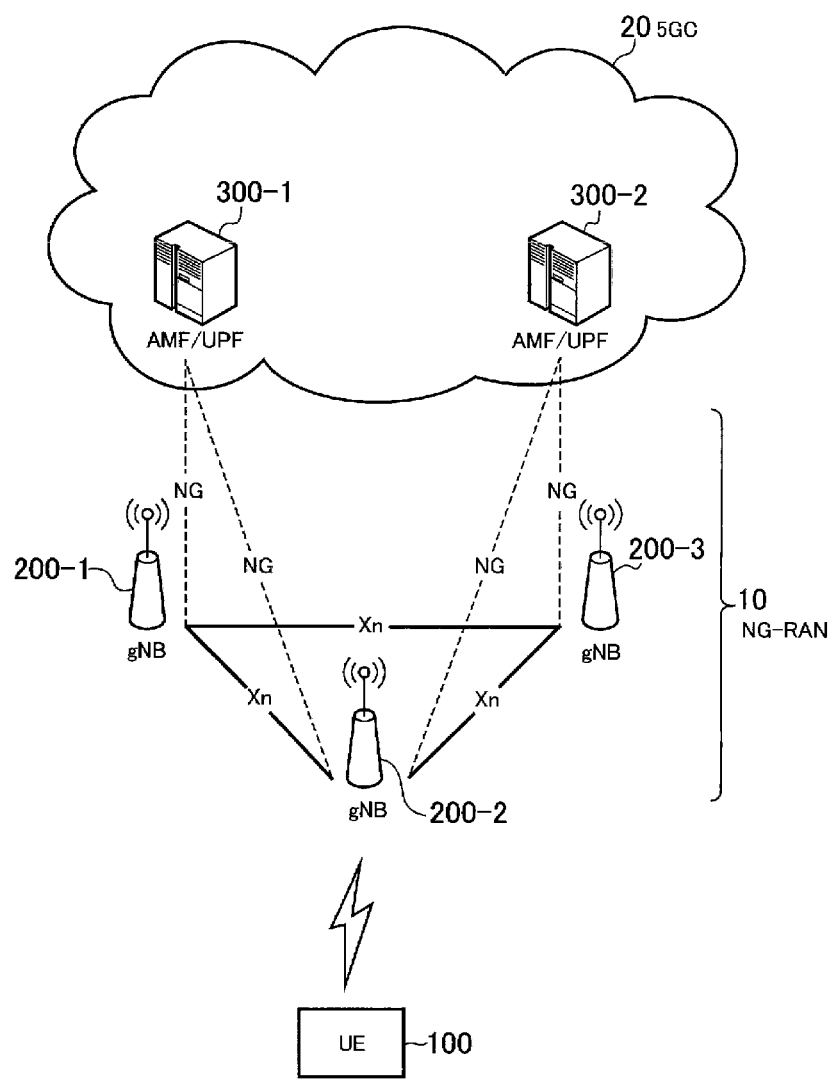
FIG. 1 is a diagram illustrating a configuration of a mobile communication system according to an embodiment.

FIG. 1 is a diagram illustrating a configuration of the mobile communication system according to an embodiment.

As illustrated in FIG. 1, the mobile communication system includes user equipment (UE) 100, a 5G radio access network (next generation radio access network (NG-RAN)) 10, and a 5G core network (5G core network (5GC)) 20.

The UE 100 is a mobile apparatus. The UE 100 may be any apparatus used by a user. Examples of the UE 100 include a mobile phone terminal (including a smartphone), a tablet terminal, a notebook PC, a communication module (including a communication card or a chipset), a sensor or an apparatus provided in a sensor, a vehicle or an apparatus (vehicle UE) provided in a vehicle, and/or a flying object or an apparatus provided in a flying object (aerial UE).

The NG-RAN 10 includes base stations (referred to as "gNBs" in the 5G system) 200. The gNB 200 may be referred to as an NG-RAN node. The gNBs 200 are connected to each other via an Xn interface being an interface between the base stations. The gNB 200 manages one or a plurality of cells. The gNB 200 performs radio communication with the UE 100 that has established connection with its own cell. The gNB 200 includes a radio resource management (RRM) function, a routing function of user data (hereinafter simply referred to as "data"), a measurement control function for mobility control and scheduling, and/or the like. The "cell" is used as a term denoting a minimum unit of a radio communication area. The "cell" is also used as a term denoting a function or a resource for performing radio communication with the UE 100. One cell belongs to one carrier frequency.

The cell managed by the gNB 200 may be a non-terrestrial cell. Regarding the gNB 200 managing the non-terrestrial cell, the following two architectures are assumed.

In the first architecture, the gNB 200 is installed on the ground. The non-terrestrial cell managed by the gNB 200 is formed with a non-terrestrial radio transceiver that relays a radio signal transmitted by the gNB 200. In this case, the non-terrestrial radio transceiver operates as a radio repeater, and relays a radio signal transmitted and received between a radio transceiver included in the gNB 200 and a radio transceiver included in the UE 100.

In the second architecture, the gNB 200 is equipped in a satellite or an aircraft. The radio transceiver included in the gNB 200 serves as a non-terrestrial radio transceiver, and forms a non-terrestrial cell. The gNB 200 may include one or a plurality of distributed units (DUs) and one central unit (CU), and in this case, the DU serves as a non-terrestrial radio transceiver and forms a non-terrestrial cell. The CU may be installed on the ground. The DU and the CU are connected via an F1 interface.

One gNB 200 may manage a plurality of non-terrestrial cells. In a first architecture, the gNB 200 installed on the ground may connect to each of a plurality of non-terrestrial radio transceivers, and manage each of the non-terrestrial cells corresponding to each of the non-terrestrial radio transceivers. In a second architecture, the gNB 200 (CU) may manage the non-terrestrial cells respectively corresponding to any one of the plurality of DUs belonging to the gNB 200.

The 5GC 20 includes an access and mobility management function (AMF) and a user plane function (UPF) 300. The AMF performs various types of mobility control and the like for the UE 100. The AMF manages information of an area in which the UE 100 exists by communicating with the UE 100 using non-access stratum (NAS) signaling. The UPF performs transfer control of data. The AMF and the UPF are connected to the gNB 200 via an NG interface being an interface between the base station and the core network.

Figure 2:
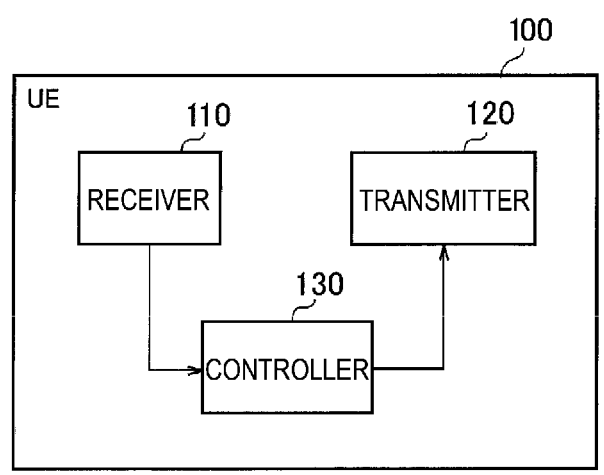
FIG. 2 is a diagram illustrating a configuration of UE 100 (user equipment) according to an embodiment.

FIG. 2 is a diagram illustrating a configuration of the UE 100 (user equipment) according to an embodiment.

As illustrated in FIG. 2, the UE 100 includes a receiver 110, a transmitter 120, and a controller 130.

The receiver 110 performs various types of reception under control of the controller 130. The receiver 110 includes an antenna and a reception device. The reception device converts a radio signal received by the antenna into a baseband signal (reception signal) and outputs the baseband signal (reception signal) to the controller 130.

The transmitter 120 performs various types of transmission under control of the controller 130. The transmitter 120 includes an antenna and a transmission device. The transmission device converts a baseband signal (transmission signal) output by the controller 130 into a radio signal and transmits the radio signal from the antenna.

Here, the reception device included in the receiver 110 and the transmission device included in the transmitter 120 correspond to the "radio transceiver included in the UE 100" described above.

The controller 130 performs various types of control in the UE 100. The controller 130 includes at least one processor and at least one memory electrically connected to the processor. The memory stores programs to be executed by the processor and information to be used for processing by the processor. The processor may include a baseband processor and a central processing unit (CPU). The baseband processor performs modulation and demodulation and coding and decoding of a baseband signal, and the like. The CPU executes the programs stored in the memory to perform various types of processing.

The UE 100 may further include an altitude sensor for measuring altitude of the UE 100.

Note that the UE 100 may further include a position sensor of a Global Navigation Satellite System (GNSS) reception device and the like. The controller 130 measures the speed of the UE 100 by calculating a position change amount per unit time by using a position sensor. Note that, when the UE 100 is a vehicle or an apparatus (vehicle UE) provided in a vehicle, speed obtained by a speedometer of the vehicle may be acquired.

Figure 3:
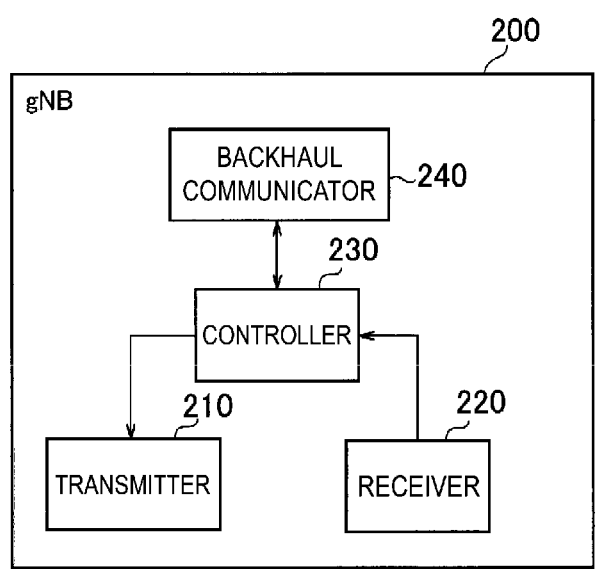
FIG. 3 is a diagram illustrating a configuration of a gNB 200 (base station) according to an embodiment.

FIG. 3 is a diagram illustrating a configuration of the gNB 200 (base station) according to an embodiment.

As illustrated in FIG. 3, the gNB 200 includes a transmitter 210, a receiver 220, a controller 230, and a backhaul communicator 240.

The transmitter 210 performs various types of transmission under control of the controller 230. The transmitter 210 includes an antenna and a transmission device. The transmission device converts a baseband signal (transmission signal) output by the controller 230 into a radio signal and transmits the radio signal from the antenna.

The receiver 220 performs various types of reception under control of the controller 230. The receiver 220 includes an antenna and a reception device. The reception device converts a radio signal received by the antenna into a baseband signal (reception signal) and outputs the baseband signal (reception signal) to the controller 230.

Here, the transmission device included in the transmitter 210 and the reception device included in the receiver 220 correspond to the "radio transceiver included in the gNB 200" described above.

The controller 230 performs various types of control in the gNB 200. The controller 230 includes at least one processor and at least one memory electrically connected to the processor. The memory stores programs to be executed by the processor and information to be used for processing by the processor. The processor may include a baseband processor and a CPU. The baseband processor performs modulation and demodulation and coding and decoding of a baseband signal, and the like. The CPU executes the programs stored in the memory to perform various types of processing.

The backhaul communicator 240 is connected to a neighboring base station via an interface between the base stations. The backhaul communicator 240 is connected to an AMF/UPF 300 via an interface between the base station and the core network.

Figure 4:
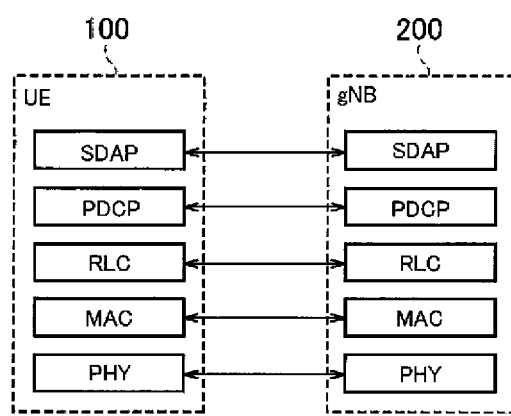
FIG. 4 is a diagram illustrating a configuration of a protocol stack in a configuration of a communication system according to an embodiment.

FIG. 4 is a diagram illustrating a configuration of a protocol stack of a radio interface in a user plane handling data.

As illustrated in FIG. 4, the radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, antenna mapping and demapping, and resource mapping and demapping. Between the PHY layer of the UE 100 and the PHY layer of the gNB 200, data and control information are transmitted via a physical channel.

The MAC layer performs preferential control of data, retransmission processing using a hybrid ARQ (HARQ), a random access procedure, and the like. Between the MAC layer of the UE 100 and the MAC layer of the gNB 200, data and control information are transmitted via a transport channel. The MAC layer of the gNB 200 includes a scheduler. The scheduler determines transport formats (transport block sizes, modulation and coding schemes (MCSs)) in the uplink and the downlink and resource blocks to be allocated to the UE 100.

The RLC layer transmits data to the RLC layer on the reception side by using functions of the MAC layer and the PHY layer. Between the RLC layer of the UE 100 and the RLC layer of the gNB 200, data and control information are transmitted via a logical channel.

The PDCP layer performs header compression and decompression, and encryption and decryption.

The SDAP layer performs mapping between an IP flow being a unit in which the core network performs QoS control and a radio bearer being a unit in which the access stratum (AS) performs QoS control. Note that, when the RAN is connected to the EPC, the SDAP layer need not be provided.

Figure 5:
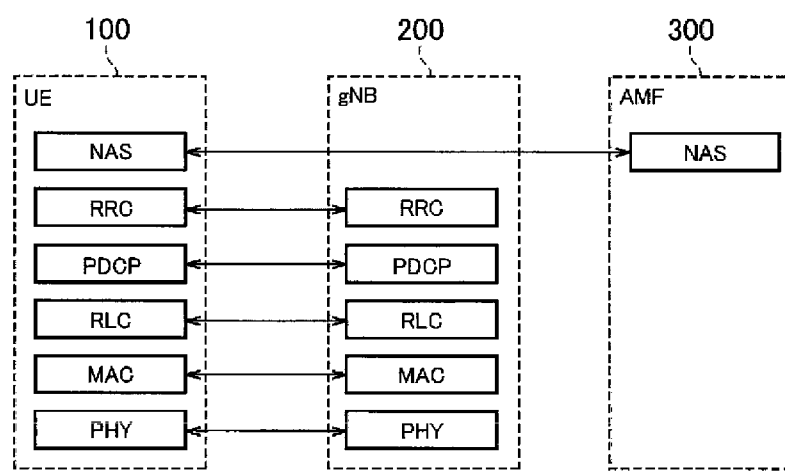
FIG. 5 is a diagram illustrating a configuration of a protocol stack in a configuration of a communication system according to an embodiment.

FIG. 5 is a diagram illustrating a configuration of a protocol stack of a radio interface of a control plane that copes with signaling (control signal).

As illustrated in FIG. 5, the protocol stack of the radio interface of the control plane includes a Radio Resource Control (RRC) layer and a Non-Access Stratum (NAS) layer instead of the SDAP layer illustrated in FIG. 4.

Between the RRC layer of the UE 100 and the RRC layer of the gNB 200, RRC signaling for various configurations is transmitted. The RRC layer controls a logical channel, a transport channel, and a physical channel according to establishment, reestablishment, and release of a radio bearer. When there is connection (RRC connection) between the RRC of the UE 100 and the RRC of the gNB 200, the UE 100 is in an RRC connected state. When there is no connection (RRC connection) between the RRC of the UE 100 and the RRC of the gNB 200, the UE 100 is in an RRC idle state. When the RRC connection is suspended, the UE 100 is in an RRC inactive state.

The NAS layer located in a layer higher than the RRC layer performs session management, mobility management, and the like. Between the NAS layer of the UE 100 and the NAS layer of the AMF 300, NAS signaling is transmitted.

Note that the UE 100 includes an application layer and the like other than the protocol of the radio interface.

Overview of Cell Reselection Operation

An overview of cell reselection operation will be described. The UE 100 in the RRC idle state or the RRC inactive measures radio quality of neighboring cells when radio quality of the current serving cell falls below a predetermined threshold. The UE 100 performs cell reselection on the basis of ranking for the plurality of measured cells. In other words, the UE 100 ranks the plurality of cells, and reselects a cell of a high rank as the serving cell. The UE 100 calculates a rank $R_s$ of the current serving cell and a rank $R_n$ of neighboring cells. The UE 100 selects a cell having a rank $R_n$ higher than $R_s$ over a predetermined period (Treselection$_{RAT}$) as a target cell.

In such a case, criteria to be satisfied by the neighboring cells may be referred to as "R-criteria". $R_s$ is calculated according to $R_s = Q_{meas, s} + Q_{Hyst} - \text{Qoffset}_{temp}$. $R_n$ is calculated according to $R_n = Q_{meas, n} - \text{Qoffset} - \text{Qoffset}_{temp}$. $Q_{meas, s}$ is a reception level (RSRP) of the current serving cell. $Q_{meas, n}$ is a reception level (RSRP) of a neighboring cell. $Q_{Hyst}$ is a hysteresis value for facilitating reselection of the current serving cell as a target cell. $\text{Qoffset}_{temp}$ is an offset temporarily applied to the current serving cell and the neighboring cells. Various parameters used in selection of the target cell are included in an SIB broadcast from the gNB 200. The various parameters include a predetermined period (Treselection$_{RAT}$) and various offsets ($\text{Qoffset}_{temp}$, $Q_{Hyst}$, Qoffset).

Communication Between UE 100 and Non-Terrestrial Cell

Communication between the UE 100 and the non-terrestrial cell according to an embodiment will be described.

The altitude of a satellite or an aircraft equipped with the non-terrestrial radio transceiver (hereinafter referred to as "altitude of the non-terrestrial radio transceiver") may be several tens of thousands of kilometers, and thus the propagation delay is large in communication between the UE 100 present on the ground and the non-terrestrial cell.

In existing 3GPP specifications, regarding communication between the UE 100 and the cell, various timers used by the UE 100 are defined. Values of such various timers are configured from the gNB 200 to the UE 100. Examples of the timer include an RA timer in a random access (RA) procedure, a timer T300 in an RRC connection procedure, and/or a timer T319 in an RRC recovery procedure. Here, the RA procedure is a procedure executed when the UE 100 transitions from the RRC idle state or the RRC inactive state to the RRC connected state and/or when the UE 100 in the RRC connected state performs handover.

The RA timer is a timer for determining waiting time in which reception of a random access response (RA response) from the cell is to be waited for after the UE 100 transmits a random access preamble (RA preamble) in the RA procedure from the UE 100 to the cell. The RA timer may be referred to as ra-ResponseWindow. In the RA procedure, the UE 100 starts the RA timer when the UE 100 transmits the RA preamble to the cell (gNB 200). After the RA timer expires without reception of the RA response, the UE 100 determines that the RA procedure has failed, and resumes the RA procedure.

The timer T300 is a timer used for the RRC connection procedure after transmission and reception of the RA preamble and the RA response in the RA procedure from the UE 100 in the RRC idle state to the cell. Specifically, the timer T300 is a timer for determining waiting time in which reception of a response message to an RRCSetupRequest message is to be waited for after transmission of the RRCSetupRequest message to the cell. In the RRC connection procedure, after the UE 100 starts T300 when transmitting an RRCSetupRequest message to the gNB 200 and T300 expires without reception of a response message to the RRCSetupRequest message, the UE 100 determines that the RRC connection procedure has failed.

The timer T319 is a timer used for the RRC recovery procedure after transmission and reception of the RA preamble and the RA response in the RA procedure from the UE 100 in the RRC inactive state to the cell. Specifically, the timer T319 is a timer for determining waiting time in which reception of a response message from the cell is to be waited for after transmission of an RRCResumeRequest message to the cell. In the RRC recovery procedure, after the UE 100 starts T319 when transmitting an RRCResumeRequest message to the gNB 200 and T319 expires without reception of a response message to the RRCResumeRequest message, the UE 100 determines that the RRC recovery procedure has failed.

Note that, while the timer T300 and the timer T319 are timers used by the RRC layer, as a similar timer, there is ra-ContentionResolutionTimer used by the MAC layer.

The propagation delay in communication with the non-terrestrial cell is by far larger than the propagation delay in communication with a terrestrial cell (a cell formed by a radio transceiver installed on the ground). Thus, when the UE 100 applies, to the non-terrestrial cell, the same timer value as that of the timer (for example, the RA timer) applied to the terrestrial cell, the UE 100 may not be able to receive a response message (for example, the RA response) within timer time. In this case, the RA procedure does not succeed, which thus inhibits the UE 100 from communicating with the non-terrestrial cell.

In an embodiment, a time offset for delaying start timing or expiration timing of the timer is applied to communication with the non-terrestrial cell. The value of the time offset may be configured in proportion to the value of altitude of the non-terrestrial radio transceiver. As the value of altitude of the non-terrestrial radio transceiver is larger, the value of the time offset may be configured to be larger. The value of the time offset may be represented in number of milliseconds (ms), or may be represented in number of subframes.

When the time offset for delaying the start timing of the timer is applied to the RA timer, the UE 100 starts the RA timer after time that is represented by the time offset has elapsed since transmission of a predetermined message. When the time offset for delaying the expiration timing of the timer is applied to the RA timer, the UE 100 starts the RA timer, with a value obtained by adding the time offset to a value of the RA timer configured from the gNB 200 being the value of the RA timer. In other words, the time offset for delaying the expiration timing of the timer is for extending the value of the timer.

The gNB 200 may include the time offset to be applied to the non-terrestrial cell in the system information block (SIB) broadcast by the non-terrestrial cell, and thereby notify the UE 100 of the time offset.

When the gNB 200 installed on the ground manages the non-terrestrial cell via the non-terrestrial radio transceiver (the first architecture described above), the gNB 200 may dynamically configure the time offset according to a change of the altitude of the non-terrestrial radio transceiver. When the gNB 200 manages a plurality of non-terrestrial cells, the gNB 200 may configure the time offset of each non-terrestrial cell according to the altitude of the non-terrestrial radio transceiver corresponding to each non-terrestrial cell.

The UE 100 applies the time offset acquired from the SIB of the non-terrestrial cell to the timer, and then performs communication with the non-terrestrial cell.

Network Environment

Figure 6:
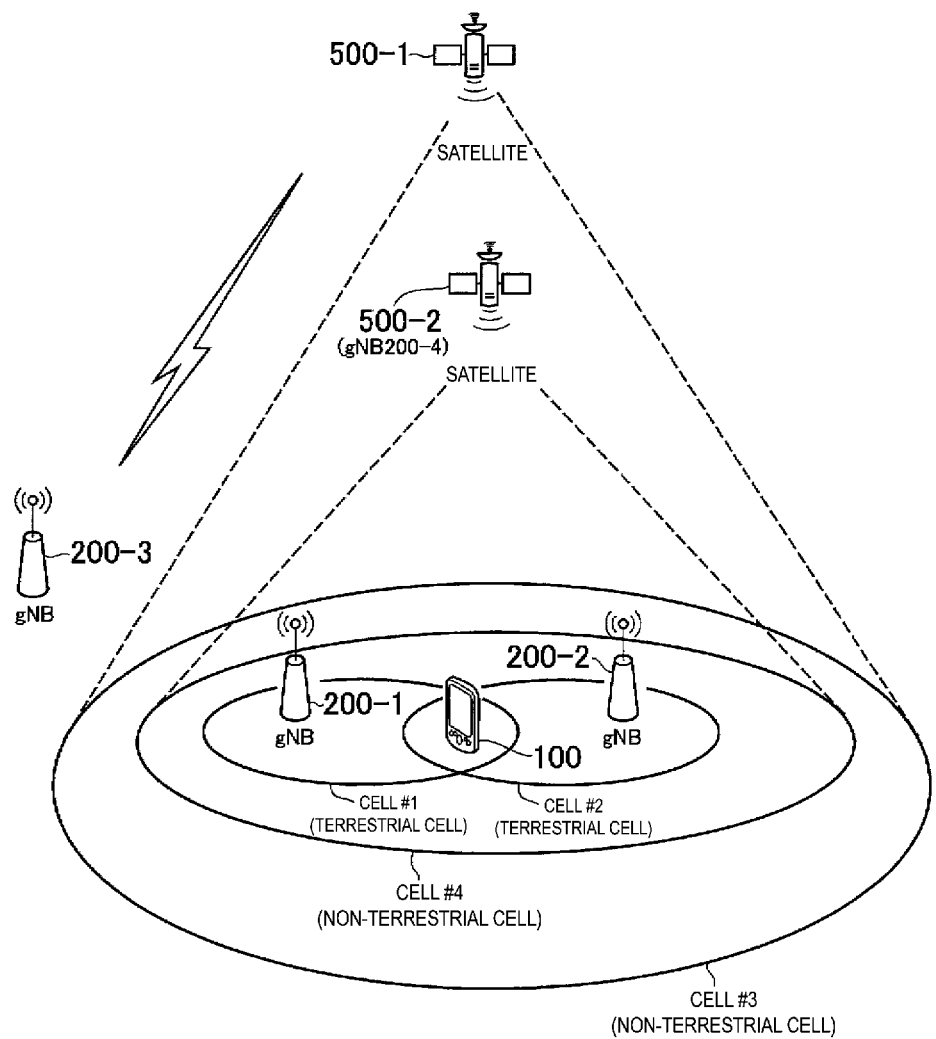
FIG. 6 is a diagram illustrating a network environment according to an embodiment.

FIG. 6 is a diagram illustrating a network environment according to an embodiment.

As illustrated in FIG. 6, the UE 100 is present in an area in which coverages of cell #1 to cell #4 overlap. Among cell #1 to cell #4, the size of the coverage of cell #3 is the largest, and the coverages of cell #1, cell #2, and cell #4 are present within the coverage of cell #3. The coverage of cell #1 and the coverage of cell #2 are present within the coverage of cell #4. The coverage of cell #1 and the coverage of cell #2 partially overlap. The UE 100 is present in the overlapping part.

Cell #1 is a terrestrial cell formed with a radio transceiver included in a gNB 200-1 installed on the ground. Cell #2 is a terrestrial cell formed with a radio transceiver included in a gNB 200-2 installed on the ground. Cell #3 is a non-terrestrial cell formed with a non-terrestrial radio transceiver equipped in a satellite 500-1. Cell #3 is managed by a gNB 200-3 installed on the ground as illustrated in the first architecture described above. Cell #4 is a non-terrestrial cell formed with a radio transceiver included in a gNB 200-4 equipped in a satellite 500-2. Cell #3 and cell #4 broadcast the time offset to be applied to the cells, using the SIB. The value of the time offset to be applied to cell #3 is larger than the value of the time offset to be applied to cell #4.

The gNB 200-1, the gNB 200-2, and the gNB 200-3 are connected to each other via an Xn interface. In contrast, the gNB 200-1, the gNB 200-2, and the gNB 200-3 do not include an Xn interface with the gNB 200-4.

First Embodiment

In the network environment illustrated in FIG. 6, the UE 100 whose current serving cell is cell #1 is in the RRC idle state. When the UE 100 determines that radio quality of cell #2 to cell #4 is more satisfactory than radio quality of cell #1, the UE 100 may reselect any one of cell #2 to cell #4 as the serving cell. In this case, when the UE 100 selects cell #3 or cell #4, the UE 100 may perform communication having a large delay. Thus, selecting cell #3 or cell #4 is not preferable for the UE 100 that desires communication having a low delay, such as ultra-reliable and low latency communications (URLLC), after transitioning to the RRC connected state.

A first embodiment is an embodiment to solve the problem as described above. The UE 100 according to the first embodiment performs cell reselection of selecting the serving cell by performing ranking based on the radio quality of a plurality of cells (cell #1 to cell #4). Based further on whether a cell is the non-terrestrial cell, the UE 100 determines the rank of the cell in cell reselection. When the cell is the non-terrestrial cell, the UE 100 may determine the rank of the cell so that the determined rank is lower than when the cell is not the non-terrestrial cell. With this configuration, the UE 100 is less liable to select the non-terrestrial cell, and can thus avoid performing communication having a large delay.

In the first embodiment, the UE 100 may determine whether the cell is the non-terrestrial cell, depending on whether the time offset is applied to the cell. The UE 100 may acquire the time offset to be applied to the cell from the SIB broadcast from the cell. The UE 100 may determine the cell that broadcasts the time offset using the SIB as the non-terrestrial cell.

In the first embodiment, the UE 100 determines the rank so that the rank is lower as the value of the time offset is larger. The value of the time offset is configured to be larger as the altitude of the non-terrestrial radio transceiver is higher, and thus the UE 100 is less liable to select the non-terrestrial cell corresponding to the non-terrestrial radio transceiver having a larger value of the altitude, and can thus avoid performing communication having a large delay.

In the first embodiment, in a case where the UE 100 is in a predetermined state, when the cell is the non-terrestrial cell, the UE 100 determines the rank of the cell so that the determined rank is higher than when the cell is not the non-terrestrial cell. The predetermined state is a state in which the value indicating the movement speed of the UE 100 is a first threshold or higher, or a state in which the value indicating the altitude of the UE 100 is a second threshold or higher. When the UE 100 is in a state of moving at a high speed, in order to obviate frequent occurrence of switch of cells, by selecting the non-terrestrial cell having large coverage, the UE 100 can perform more stable communication. When the UE 100 is an aerial UE or the UE 100 is in a flying object and flies at high altitude, the distance from the non-terrestrial radio transceiver is shorter, and thus undesirably, a delay occurs in communication with the terrestrial cell. In this case, by selecting the non-terrestrial cell, the UE 100 can perform more stable communication with a lower delay.

Figure 7:
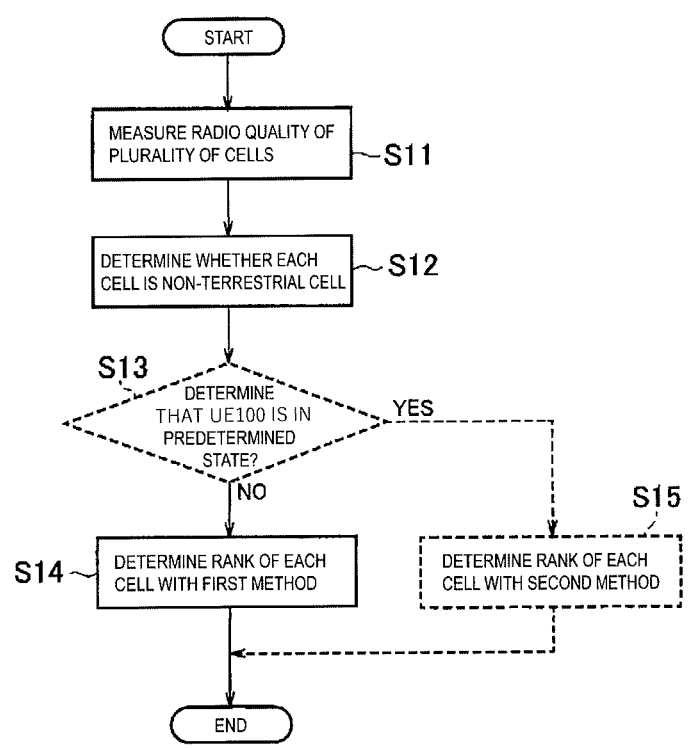
FIG. 7 is a diagram illustrating an operation flow according to a first embodiment.

FIG. 7 is a diagram illustrating an operation flow of the UE 100 according to the first embodiment.

In Step S11, the UE 100 starts measurement in response to falling of quality of the current serving cell (cell #1) below a predetermined threshold, and measures radio quality of each of cell #2 to cell #4.

In Step S12, the UE 100 determines whether the cell is the non-terrestrial cell, regarding each of cell #2 to cell 4. The UE 100 may determine each of cell #3 and cell #4 that broadcast the time offset as the non-terrestrial cell. The UE 100 may determine whether the cell is the non-terrestrial cell, based on predetermined information other than the time offset. The predetermined information includes information indicating altitude of the cell (altitude of the radio transceiver that forms the cell) and/or a flag indicating that the cell is the non-terrestrial cell. The predetermined information may be broadcast using the SIB of the cell.

The UE 100 may acquire the time offset to be applied to the non-terrestrial cell from a cell near the non-terrestrial cell. For example, the UE 100 may acquire the time offset to be applied to cell #3 from the SIB broadcast by cell #1. In this case, cell #1 broadcasts a cell list indicating a plurality of cells near the cell on the SIB, and the cell list includes a cell identifier of each cell and a time offset to be applied to each cell. The UE 100 acquires the time offset to be applied to cell #3 by reading the SIB of cell #1.

In Step S13, the UE 100 determines whether the UE 100 is in the predetermined state described above. When the UE 100 determines that the UE 100 is not in the predetermined state (Step S13: NO), the UE 100 advances the processing to Step S14. In contrast, when the UE 100 determines that the UE 100 is in the predetermined state (Step S13: YES), the UE 100 advances the processing to Step S15. Note that Step S13 is not necessarily required and may be omitted. When Step S13 is omitted, the processing is advanced to Step S14.

In Step S14, the UE 100 determines the rank ($R_n$ described above) of each of cell #2 to cell #4 with a first method (a method of preferentially selecting the terrestrial cell). In the first method, when a cell is the non-terrestrial cell, the UE 100 determines the rank of the cell so that the determined rank is lower than when the cell is not the non-terrestrial cell.

For example, when the UE 100 determines $R_n$ of the non-terrestrial cell, the UE 100 calculates $R_n$ by multiplying "Qoffset" in the above-described expression of "$R_n = Q_{meas, n} - \text{Qoffset} - \text{Qoffset}_{temp}$" by the value of the time offset. When the UE 100 calculates $R_n$ of the terrestrial cell, the UE 100 does not multiply "Qoffset" by the value of the time offset. In other words, the UE 100 calculates the rank of cell #2 according to "$R_n = Q_{meas, n} - \text{Qoffset} - \text{Qoffset}_{temp}$", and calculates the rank of cell #3 and cell #4 according to "$R_n = Q_{meas, n} - \text{Qoffset} \times \text{time offset} - \text{Qoffset}_{temp}$". The value of the time offset to be applied to cell #3 is larger than the value of the time offset to be applied to cell #4, and thus when the radio qualities ($Q_{meas, n}$) regarding cell #2 to cell #4 are substantially the same, and the same "Qoffset" and "$\text{Qoffset}_{temp}$" are applied to cell #2 to cell #4, the rank of cell #3 is determined so that the determined rank is lower than the rank of cell #4, and the rank of cell #4 is determined so that the determined rank is lower than the rank of cell #2.

The value of Qoffset may be configured for each value of the time offset (or the range of the value). In this case, when the UE 100 determines $R_n$ of the non-terrestrial cell, the UE 100 refers to the value of the time offset to be applied to the non-terrestrial cell, and applies the configured Qoffset value. Qoffset for each of the time offset may be informed and configured using the SIB.

When the UE 100 desires to perform communication whose allowable delay is less than a threshold after transitioning to the RRC connected state, the UE 100 may determine the rank of the non-terrestrial cell so that the determined rank is the lowest rank, or may exclude the non-terrestrial cell from the ranking. For example, when the UE 100 calculates the rank of the non-terrestrial cell, the UE 100 applies infinite "Qoffset".

In Step S15, the UE 100 determines the rank ($R_n$ described above) of each of cell #2 to cell #4 with a second method (a method of preferentially selecting the non-terrestrial cell). In the second method, when the cell is the non-terrestrial cell, the UE 100 determines the rank of the cell so that the determined rank is higher than when the cell is not the non-terrestrial cell. For example, when the UE 100 calculates the rank of the non-terrestrial cell, the UE 100 applies $\text{Qoffset}_{NTN}$ common to the non-terrestrial cells. In other words, the UE 100 calculates the ranks of cell #3 and cell #4 according to "$R_n = Q_{meas, n} - \text{Qoffset} - \text{Qoffset}_{temp} + \text{Qoffset}_{NTN}$". With this, the ranks of cell #3 and cell #4 are determined so that the determined ranks are higher than that of cell #2.

In Step S15, the UE 100 may select only the non-terrestrial cell. In this case, the UE 100 determines the rank of the terrestrial cell so that the determined rank is the lowest rank.

When it is determined in Step S13 that the value indicating the altitude of the UE 100 is in a state of the second threshold or higher, the UE 100 may determine in Step S15 the rank of the non-terrestrial cell, based further on a difference between the altitude of the non-terrestrial cell and the altitude of the UE 100. When the difference between the altitude of the non-terrestrial cell and the altitude of the UE 100 is a threshold or less, the UE 100 determines the rank of the non-terrestrial cell so that the determined rank is higher than when this is not the case. The UE 100 may determine the altitude of the non-terrestrial cell according to the time offset, or may specify the altitude of the non-terrestrial cell based on information indicating the altitude of the cell included in the SIB of the non-terrestrial cell.

Second Embodiment

In the first embodiment, the UE 100 is in the RRC idle state or the RRC inactive state and performs cell reselection, whereas in a second embodiment, the UE 100 is in the RRC connected state and performs handover.

In the network environment illustrated in FIG. 6, the UE 100 is in the RRC connected state with cell #1 (gNB 200-1). The UE 100 is present in the area in which the coverages of cell #1 to cell #4 overlap. When the UE 100 performs handover from cell #1 being a source cell to the non-terrestrial cell (for example, cell #3) being a target cell, the UE 100 performs the RA procedure for establishing synchronization with the target cell after receiving indication (RRCReconfiguration) of the handover from the source cell.

RRCReconfiguration includes information of the RA timer for the RA procedure. There is a possibility that the UE 100 has already measured radio quality of the target cell but has not yet read the SIB. Accordingly, there is a possibility that the UE 100 does not recognize that the target cell is the non-terrestrial cell and undesirably uses the RA timer to which the time offset is not applied, and thus does not succeed in the RA procedure.

The second embodiment is an embodiment to solve the problem as described above. The UE 100 according to the second embodiment performs handover from the source cell to the target cell. When the target cell is the non-terrestrial cell, the UE 100 receives the time offset to be applied to communication with the non-terrestrial cell from the source cell. With this, the UE 100 can use the RA timer to which the time offset is applied.

Figure 8:
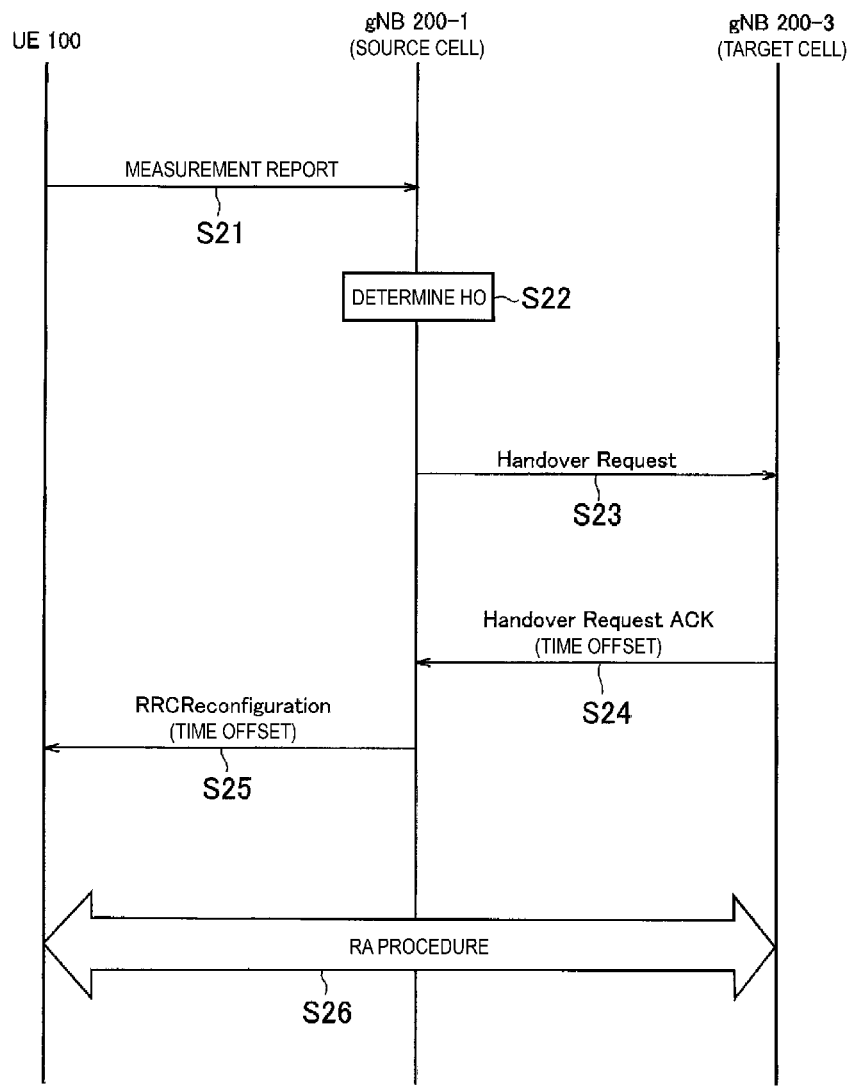
FIG. 8 is a diagram illustrating a sequence of operation according to a second embodiment.

FIG. 8 is a diagram illustrating a sequence of operation according to the second embodiment.

In Step S21, the UE 100 transmits a measurement report including radio quality of cell #1 to cell #4 to the gNB 200-1, in accordance with a measurement configuration configured by the gNB 200-1.

In Step S22, the gNB 200-1 determines whether to execute handover, based on the measurement report. The description herein continues on the assumption that the gNB 200-1 determines that the handover to cell #3 (gNB 200-3) is executed.

In Step S23, the gNB 200-1 transmits a handover request (Handover Request) message to the gNB 200-3. The Handover Request message is a message for requesting preparation of resources for the handover.

The gNB 200-3 determines whether to approve the handover request after receiving the Handover Request message. The description continues on the assumption that the gNB 200-3 determines that the handover request is approved.

In Step S24, the gNB 200-3 transmits a handover request approval (Handover Request ACK) message to the gNB 200-1. The gNB 200-1 receives the Handover Request ACK message from the eNB 200-3. The Handover Request ACK message includes information of the time offset to be applied to cell #3 (target cell) being a handover target of the UE 100.

In Step S25, the gNB 200-1 transmits, to the UE 100, a message (RRCReconfiguration) for starting the handover from cell #1 (gNB 200-1) to cell #3 (gNB 200-3). The message includes information of the RA timer and the time offset to be applied to cell #3 (target cell).

In Step S26, the UE 100 performs the RA procedure for the gNB 200-3 by using the RA timer to which the time offset is applied.

Modification 1 of Second Embodiment

In modification 1, the UE 100 performs handover from the source cell (for example, cell #3) being a non-terrestrial cell to the target cell (for example, cell #1) being a terrestrial cell. In this case, if the UE 100 performs the RA procedure for cell #1 while applying the time offset, unnecessary waiting time may occur. In order to solve the problem described above, when the target cell is the terrestrial cell, the source cell transmits, to the UE 100, information indicating release of the application of the time offset on RRCReconfiguration.

Figure 9:
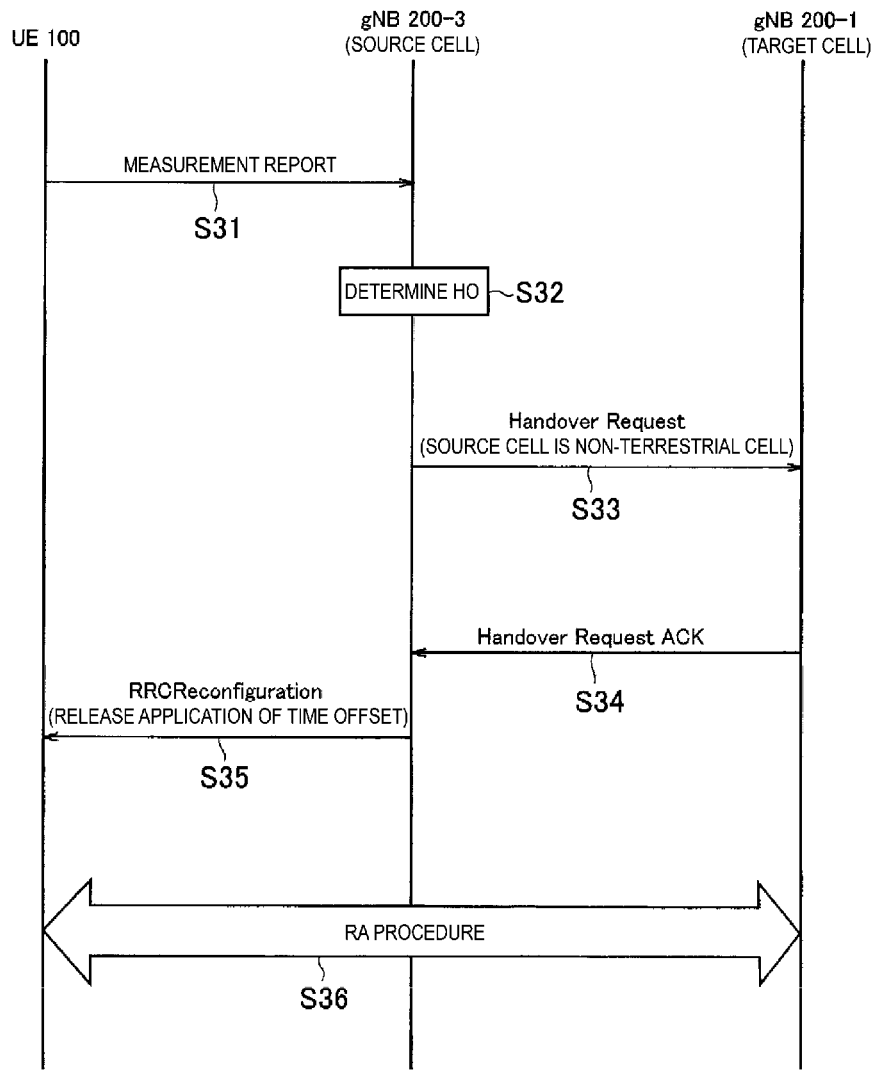
FIG. 9 is a diagram illustrating a sequence of operation according to modification 1 of the second embodiment.

FIG. 9 is a diagram illustrating a sequence of operation according to modification 1.

In Step S31, the UE 100 transmits, to the gNB 200-1, a measurement report including radio quality of cell #1, cell #2, and cell #4, in accordance with a measurement configuration configured by the gNB 200-3.

In Step S32, the gNB 200-3 determines whether to execute handover, based on the measurement report. The description herein continues on the assumption that the gNB 200-3 determines that the handover to cell #1 (gNB 200-1) is executed.

In Step S33, the gNB 200-3 transmits a handover request message to the gNB 200-1. The handover request message includes information indicating that the source cell (cell #3) is the non-terrestrial cell. With this, the gNB 200-1 can recognize that the UE 100 applies the time offset.

In Step S34, the gNB 200-1 transmits a Handover Request ACK message to the gNB 200-1. The Handover Request ACK message may include information indicating that cell #1 is the terrestrial cell. The Handover Request ACK message may include information indicating that application of the time offset to cell #1 is unnecessary.

In Step S35, the gNB 200-3 transmits, to the UE 100, a message (RRCReconfiguration) for starting the handover from cell #3 (gNB 200-1) to cell #1 (gNB 200-1). The RRCReconfiguration message includes information indicating release of the application of the time offset. The release of the application of the time offset may be explicitly indicated using an information element indicating release of a time offset value, or may be implicitly informed by not giving a notice of and not performing configuration of an information element indicating a time offset value. For example, when the UE 100 receives the RRCReconfiguration message not including the information element indicating a time offset value, the UE 100 releases the application of the time offset.

In Step S36, the UE 100 performs the RA procedure for the gNB 200-1 by using the RA timer without applying the time offset.

Modification 2 of Second Embodiment

In modification 2, the UE 100 performs handover between the gNB s 200 not including an Xn interface. By taking an example of the network environment illustrated in FIG. 6, the UE 100 performs handover from cell #1 (gNB 200-1) to cell #4 (gNB 200-4). In this case, information (for example, information indicating the time offset) transmitted and received between the gNBs 200 in the second embodiment is transmitted and received via the AMF 300 (core network apparatus).

The description continues on the assumption that each of the gNB 200-1 and the gNB 200-4 includes an NG interface with an AMF 300-1.

Figure 10:
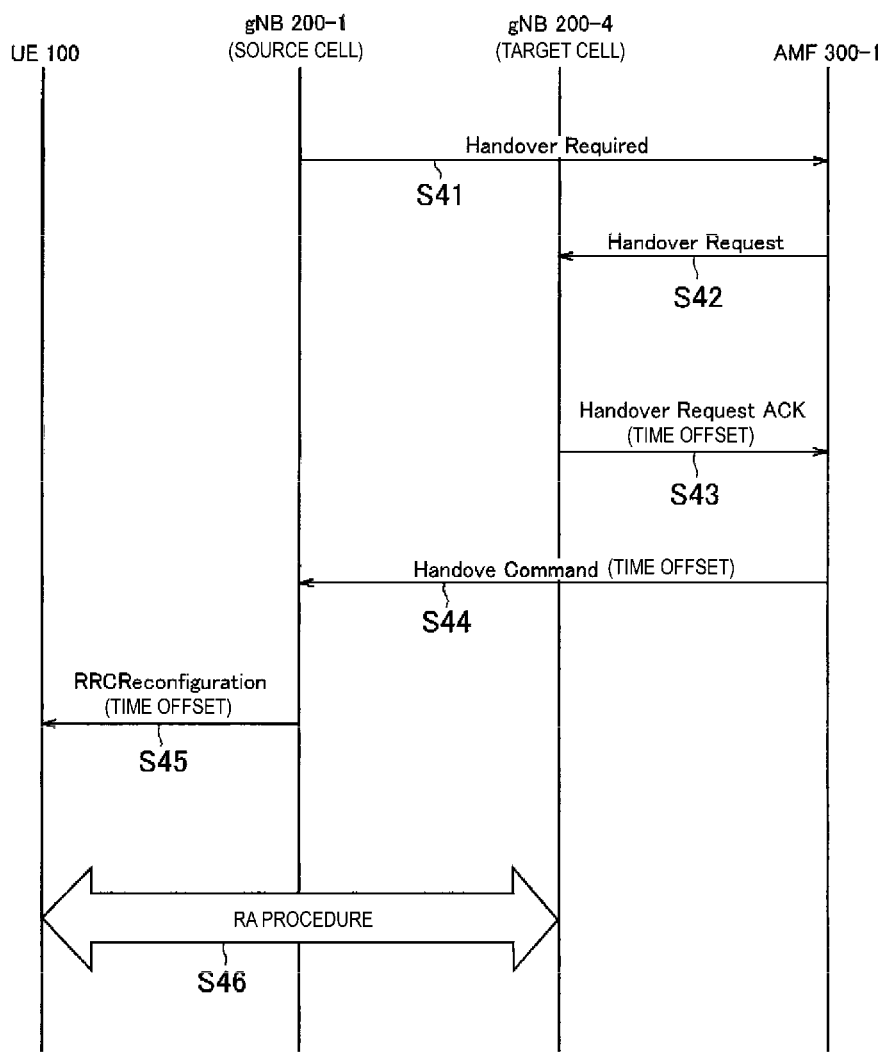
FIG. 10 is a diagram illustrating a sequence of operation according to modification 2 of the second embodiment.

FIG. 10 is a diagram illustrating a sequence of operation according to modification 2.

In Step S41, the gNB 200-1 transmits a Handover Required message to the AMF 300-1.

In Step S42, the AMF 300-1 transmits the Handover Request message to the gNB 200-4.

In Step S43, the gNB 200-4 transmits a Handover Request ACK message to the AMF 300-1. The Handover Request ACK message includes information indicating the time offset to be applied to cell #4.

In Step S44, the AMF 300-1 transmits a Handover Command message to the gNB 200-1. The Handover Command message includes information indicating the time offset to be applied to cell #4.

In Step S45, the gNB 200-1 transmits an RRCReconfiguration message for starting handover to the UE 100. The RRCReconfiguration message includes information indicating the time offset to be applied to cell #4.

In Step S46, the UE 100 performs the RA procedure for the gNB 200-4 by using the RA timer to which the time offset is applied.

Modification 3 of Second Embodiment

In modification 3, the UE 100 performs handover between the gNBs 200 not including an Xn interface. By taking an example of the network environment illustrated in FIG. 6, the UE 100 performs handover from cell #4 (gNB 200-4) to cell #1 (gNB 200-1). In this case, information (for example, information indicating that the source cell is the non-terrestrial cell) transmitted and received between the gNBs 200 in modification 1 is transmitted and received via the AMF 300.

Figure 11:
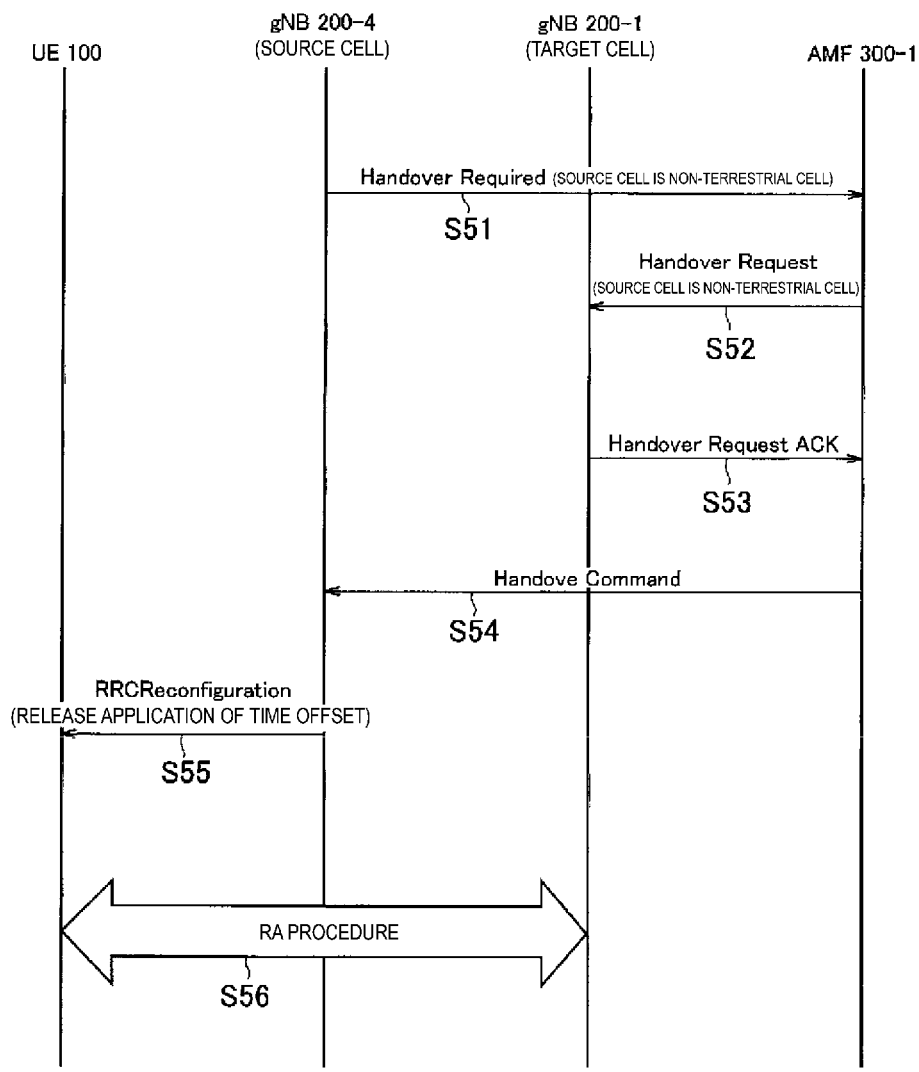
FIG. 11 is a diagram illustrating a sequence of operation according to modification 3 of the second embodiment.

FIG. 11 is a diagram illustrating a sequence of operation according to modification 3.

In Step S51, the gNB 200-1 transmits a Handover Required message to the AMF 300-1. The Handover Required message includes information indicating that the source cell (cell #4) is the non-terrestrial cell.

In Step S52, the AMF 300-1 transmits a Handover Request message to the gNB 200-4. The Handover Request message includes information indicating that the source cell (cell #4) is the non-terrestrial cell.

In Step S53, the gNB 200-4 transmits a Handover Request ACK message to the AMF 300-1. The Handover Request ACK message may include information indicating that cell #1 is the terrestrial cell. The Handover Request ACK message may include information indicating that application of the time offset to cell #1 is unnecessary.

In Step S54, the AMF 300-1 transmits a Handover Command message to the gNB 200-1. The Handover Command message may include information indicating that cell #1 is the terrestrial cell. The Handover Command message may include information indicating that application of the time offset to cell #1 is unnecessary.

In Step S55, the gNB 200-4 transmits an RRCReconfiguration message for starting handover to the UE 100. The RRCReconfiguration message includes information indicating release of the application of the time offset. The release of the application of the time offset may be explicitly indicated using an information element indicating release of a time offset value, or may be implicitly informed by not giving a notice and performing configuration of an information element indicating a time offset value.

In Step S56, the UE 100 performs the RA procedure for the gNB 200-1 by using the RA timer without applying the time offset.

OTHER EMBODIMENTS

In the embodiments described above, the time offset is configured from the gNB 200 to the UE 100. However, the time offset may be determined by the UE 100 itself. In this case, the UE 100 specifies the altitude of the non-terrestrial cell, based on information indicating the altitude of a cell included in the SIB of the non-terrestrial cell, and calculates the time offset to be applied to the non-terrestrial cell from a difference between the altitude of the non-terrestrial cell and the altitude of the UE 100.

The UE 100 may apply an adjustment value to the time offset, using the altitude of the UE 100. With this, the time offset value between the UE 100 and the non-terrestrial cell can be appropriately adjusted. The adjustment value may be applied after the UE 100 calculates a propagation delay based on its own altitude information, or the adjustment value for each altitude may be configured from the gNB 200. When the adjustment value is configured from the gNB 200, notification and configuration may be performed using the SIB.

A program may be provided that causes a computer to execute each process performed by the UE 100, the gNB 200, or the AMF 300. The program may be recorded in a computer-readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like. A chipset including a memory that stores a program for executing each process performed by the UE 100 and the eNB 200 and a processor that executes the program stored in the memory may be provided.

Embodiments have been described above in detail with reference to the drawings, but specific configurations are not limited to those described above, and various design modifications can be made without departing from the gist of the present disclosure.

The invention claimed is:

1. A communication control method for cell reselection of selecting a serving cell of user equipment by ranking a plurality of cells based on radio quality, the communication control method comprising:
    based further on whether a cell is a non-terrestrial cell, the non-terrestrial cell being formed by a radio transceiver of a satellite or an aircraft, determining, by the user equipment, a rank of the cell in the cell reselection.

2. The communication control method according to claim 1, wherein
    the determining includes determining whether the cell is the non-terrestrial cell, depending on whether a time offset is applied to the cell, and
    the time offset is time for delaying start timing or expiration timing of a timer used by the user equipment at time of performing communication between the user equipment and the cell.

3. The communication control method according to claim 2, wherein the timer is a timer for determining waiting time in which reception of a response message from the cell is to be waited for in a random access procedure for the cell.

4. The communication control method according to claim 2, wherein
the determining includes determining the rank of the cell to be lower as a value of the time offset is larger.

5. The communication control method according to claim 1, wherein
the determining includes, when the cell is the non-terrestrial cell, determining the rank of the cell so that the determined rank is lower than when the cell is not the non-terrestrial cell.

6. The communication control method according to claim 1, wherein
the determining includes, in a case where the user equipment is in a predetermined state and the cell is the non-terrestrial cell, determining the rank of the cell so that the determined rank is higher than when the cell is not the non-terrestrial cell, and
the predetermined state is a state in which a value indicating a movement speed of the user equipment is a first threshold or higher, or a state in which the user equipment is a flying object or an apparatus provided in the flying object and a value indicating altitude of the user equipment is a second threshold or higher.

7. A communication control method for performing handover of user equipment from a source cell to a target cell, the communication control method comprising:
when the target cell is a non-terrestrial cell formed by a radio transceiver of a satellite or an aircraft, receiving, by the user equipment, a time offset to be applied to communication with the non-terrestrial cell from the source cell, wherein
the time offset is time for delaying start timing or expiration timing of a timer used at time of performing communication with the target cell.

8. The communication control method according to claim 7, wherein
the timer is configured to determine waiting time in which reception of a response message from the target cell is to be waited for in a random access procedure for the target cell.

9. The communication control method according to claim 7, further comprising:
receiving, by a first base station configured to manage the source cell, information indicating the time offset from a second base station configured to manage the target cell.

10. The communication control method according to claim 7, further comprising:
transmitting, by a second base station configured to manage the target cell, information indicating the time offset to a core network apparatus; and
receiving, by a first base station configured to manage the source cell, the information indicating the time offset from the core network apparatus.

11. User equipment for performing cell reselection of selecting a serving cell by ranking a plurality of cells based on radio quality, the user equipment comprising:
a processor configured to execute processing of, based further on whether a cell is a non-terrestrial cell, the non-terrestrial cell being formed by a radio transceiver of a satellite or an aircraft, determining a rank of the cell in the cell reselection.

* * * * *